United States Patent [19]

DiGeorge

[11] Patent Number: 5,197,750
[45] Date of Patent: Mar. 30, 1993

[54] INCLINE CLIMBING BRAKE FOR WHEELCHAIRS

[76] Inventor: Michael A. DiGeorge, P.O. Box 563, Sulphur, La. 70664-0563

[21] Appl. No.: 719,503

[22] Filed: Jun. 24, 1991

[51] Int. Cl.$^5$ ............................................. B62M 1/14
[52] U.S. Cl. .................................. 280/250.1; 188/2 F
[58] Field of Search ........................ 280/250.1, 304.1; 188/2 F, 82.1, 82.2

[56] References Cited

U.S. PATENT DOCUMENTS

| 4,045,047 | 8/1977 | Buckley | 280/250.1 |
| 4,727,965 | 3/1988 | Zach et al. | 280/250.1 X |
| 4,733,755 | 3/1988 | Manning | 188/2 F |
| 4,987,978 | 1/1991 | Jungersen | 188/2 F |

FOREIGN PATENT DOCUMENTS 1210824 2/1986 U.S.S.R. ...................... 280/250.1

Primary Examiner—Margaret A. Focarino
Assistant Examiner—Carla Mattix
Attorney, Agent, or Firm—Jacobson, Price, Holman & Stern

[57] ABSTRACT

An incline climbing brake for wheelchairs in which each of the large wheels on a wheelchair is provided with a selective ratchet assembly which enables the wheels to rotate in only one direction thereby enabling a wheelchair occupant to safely maneuver a wheelchair in order to roll it up an incline in either a forward or rearward direction. The ratchet assembly includes a ratchet gear non-rotatably secured to the wheelchair at the center of rotation of the wheel by a bracket attached to a frame member of the wheelchair and connected to the axle bolt in a manner to prevent the axle bolt from rotating in relation to the wheelchair frame member. Manually operated direction controlling pawls are engageable with the stationary ratchet wheel. Expandable arms mount the ratchet assembly from the rim of the large wheel of a wheelchair with the ratchet assembly enabling rotation of the wheel in one direction only with the pawls enabling reversal of the one-way direction of rotation of the large wheelchair wheel.

12 Claims, 1 Drawing Sheet

INCLINE CLIMBING BRAKE FOR WHEELCHAIRS

BACKGROUND OF THE INVENTION

1. Field of the Invention

The present invention generally relates to an improvement in wheelchair structures and more particularly an incline climbing brake for wheelchairs in which each of the large wheels on a wheelchair is provided with a selective ratchet assembly which enables the wheels to rotate in only one direction thereby enabling a wheelchair occupant to safely maneuver a wheelchair in order to roll it up an incline in either a forward or rearward direction. The ratchet assembly includes a ratchet wheel non-rotatably secured to the wheelchair at the center of rotation of the wheel and manually operated direction controlling pawls engageable with the stationary ratchet wheel. Expandable arms mount the ratchet assembly from the rim of the large wheel of a wheelchair with the ratchet assembly enabling rotation of the wheel in one direction only with the pawls enabling reversal of the one-way direction of rotation of the large wheelchair wheel.

2. Information Disclosure Statement

Various efforts have been made to provide structures to prevent wheelchairs from rolling down an incline due to the force of gravity in which ratchet devices are used. Also, various types of brakes and one-way clutches have been associated with wheelchairs to prevent a wheelchair from rolling down an incline. The following U.S. patents disclose structures which are relevant to the invention but do not disclose the structural arrangement disclosed in this application.

| | |
|---|---|
| 3,226,190 | 4,392,690 |
| 3,847,440 | 4,462,605 |
| 3,897,857 | 4,560,033 |
| 4,334,690 | |

SUMMARY OF THE INVENTION

An object of the present invention is to provide an incline climbing brake for wheelchairs in the form of an attachment that includes a ratchet assembly having one component rigidly affixed to the wheelchair in axial alignment with the rotational axis of each large wheel on the wheelchair with the other component of the ratchet assembly being connected to the rim of the large wheel on the wheelchair thereby enabling each of the large wheels on a wheelchair to be rotated in a single direction for aiding a wheelchair occupant to roll up an incline.

Another object of the invention is to provide an incline climbing brake for wheelchairs in which the single rotational direction of the large wheels on the wheelchair can be selected to enable the wheelchair to roll up an incline in a forward or rearward direction.

A further object of the invention is to provide an incline climbing brake for wheelchairs in accordance with the preceding objects in which the brake is in the form of an attachment that includes a ratchet assembly associated with the stationary axle and rotatable large wheel to lock each of the wheels independently of each other for rotation in only one direction with the attachment being relatively simple in construction, easy to assemble onto existing wheelchairs or new wheelchairs as they are being constructed, and dependable and safe in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
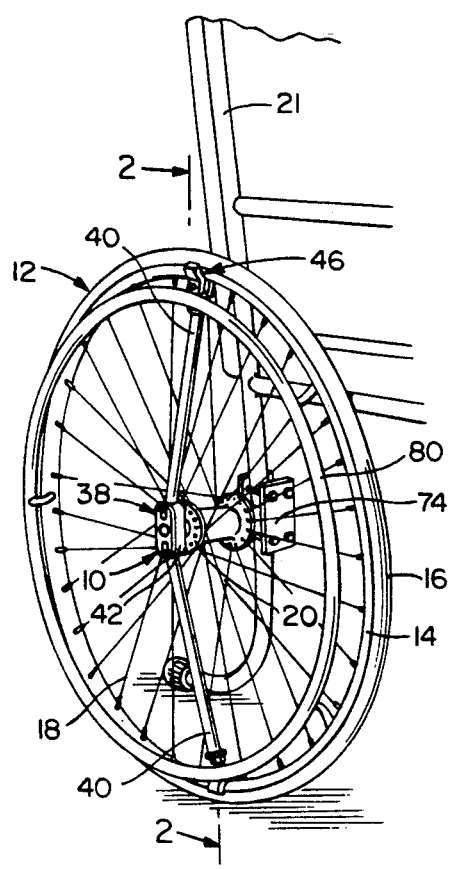
FIG. 1 is a fragmental perspective view of the incline climbing brake of the present invention associated with the large wheel of a wheelchair.

Referring now specifically to the drawings, the incline climbing brake for wheelchairs is generally designated by reference numeral 10 and is in the form of an attachment associated with the large wheel 12 on the wheelchair. It is pointed out that each of the large wheels 12 on a wheelchair will be provided with an incline climbing brake which operate independently of each other which not only enables the wheelchair occupant to roll up an incline but also enables the occupant to steer the wheelchair by independently rotating the large wheels in a conventional manner. The wheelchair wheel 12 is of conventional construction and includes a rim 14 having a tire 16 mounted thereon ar d supported by a plurality of spokes 18 extending from a wheel hub 20 which is mounted on the wheelchair frame 21 in a conventional and well-known manner by a bolt 22 forming a stationary axle on which the wheelchair hub 20 rotates with the bolt 22 including a hex nut 24 screw threaded on the inner threaded end thereof and secured from rotation by a pin 26 which extends through the nut 24 and bolt 22 to insure that the bolt 22 and nut 24 will not rotate in relation to each other. The outer end of the bolt 22 includes a hex head 28 which is engaged with the inner end of a hex socket 30 that becomes fixed in relation to the axle bolt 22 when engaged with the hexogonal head 28 of the bolt 22. The socket 30 includes a square bore or recess 32 receiving a square shaft 34 similar to the drive shaft normally engaged with a hex socket with the shaft 34 including a ball detent 36 to enable detachable connection between the shaft 34 and the socket 30 when attaching the incline climbing brake 10 or removing it from the wheelchair. The shaft 34 is connected with a ratchet assembly generally designated by reference numeral 38 and which is similar to the ratchet assembly disclosed in my U.S. Pat. No. 4,520,804 issued Jun. 4, 1985 for Double Locking Ratchet for Orthopedic Brace which patent and structure is incorporated herein by reference thereto.

Extending outwardly from the ratchet assembly 38 is a pair of diametrically opposed rigid pipes 40 which are rigidly connected to the casing 42 forming part of the ratchet assembly by welding or the like. The pipes 40 extend radially from the ratchet assembly and rotate with the casing of the ratchet assembly about the axes of the axle bolt 22. Telescoped into the outer ends of the pipes 40 is an externally threaded rod or dowel 44 having an adjustable clamp 46 mounted on the outer end thereof. The clamp 46 includes a pair of oppositely facing arcuate members 48 secured to the outer end of the externally threaded rod or dowel 44 by welding as at 50 with a clamp bolt 52 extending through lateral extensions 54 on the arcuate clamp members 48. Rotation of the clamp bolt 52 will move the arcuate clamp members 48 towards each other to a limited degree to engage the rim 14 on the wheelchair wheel 12 with the welds 50 enabling sufficient flexing or bending of the clamp members 48 to securely mount the adjustable clamps 46 to the rim 14. Threadably mounted on the threaded rod 44 is a square or hex nut 56 which is disposed outwardly of the end of the pipe 40 with a washer 58 of rubber or other resilient material interposed between the end of the pipe 40 and the nut 56. With this construction, by rotating the nut 56, the adjustable clamps can be moved outwardly to securely lock the clamps 46 to the wheel rim 14 with the rubber washers providing a resilient bias to continually retain the adjustable clamps 46 in secure locking engagement with the rim 14. By rotating the nuts 56 in the opposite direction, the clamp members 46 can be loosened to enable removal of the incline climbing brake from the wheelchair if desired thus enabling the incline climbing brake to be easily attached to or removed from existing wheelchairs or incorporated into new wheelchairs as they are constructed.

The ratchet assembly 38 includes a centrally disposed ratchet gear or wheel 60 oriented internally of the housing 42 that is rigid with or integral with the square shaft 34. Also disposed in the casing 42 is a pair of pivotal ratchet pawls 62 and 64 which are associated with the ratchet wheel 60 to enable the ratchet wheel 60 to rotate in one direction when the pawl 62 is engaged with the ratchet wheel and in the opposite direction when the pawl 64 is engaged with the ratchet wheel. The pawl 62 is provided with an operating handle or knob 66 oriented adjacent the outer surface of the casing and, likewise, the pawl 64 includes an operating knob or handle 68. The handles 66 and 68 enable the pawls 62 and 64 to be selectively engaged with the ratchet wheel 60. Thus, by pivoting the knobs or handles 66 and 68 to a predetermined setting, the wheel 12 can be locked to permit it to turn in only one direction and this direction can be selected as a forward direction or a rearward direction depending upon the positioning of the knobs or handles 66 and 68 and thus the positioning of the ratchet pawls 62 and 64. The ratchet wheel or gear 60 is stationary and non-rotatable due to the connection with bolt 22 while the housing 42, pipes 40 and adjustable clamps 46 and wheel 12 are rotatable in a selected single direction. The structure and operation of the ratchet assembly 38 is the same as that disclosed in my prior U.S. Pat. No. 4,520,804. Since the clamps 46 are fixedly secured to the wheel rim, the ratchet mechanism 38 enables the wheel to be rotated in only a single selected direction with the occupant of the wheelchair being able to select the direction of rotation of the wheel by pivoting the knobs or handles 66 and 68 which are accessible since they are located just outwardly of the wheel hub.

Figure 2:
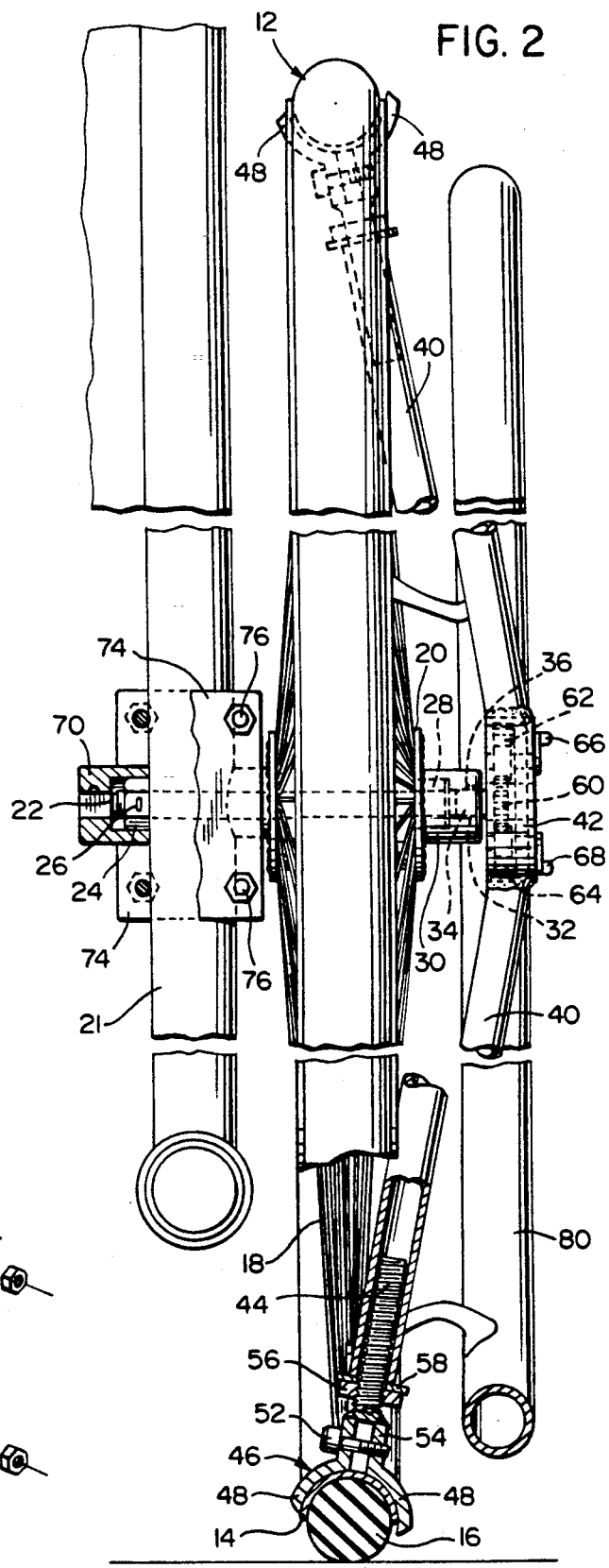
FIG. 2 is a sectional view on an enlarged scale, taken substantially upon a plane passing along section line 2—2 on FIG. 1 illustrating the association of the incline climbing brake with the frame of the wheelchair, the stationary wheel axle bolt and the rotatable wheel hub.
Figure 3:
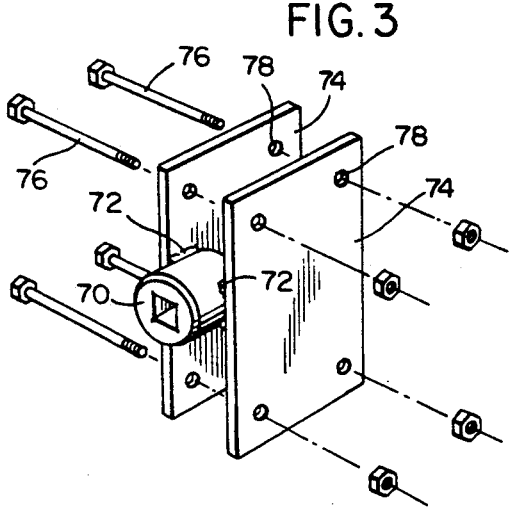
FIG. 3 is a perspective view of the bracket to restrict rotation of the axle bolt.

In order to assure that the axle bolt 22 will not rotate in relation to the wheelchair frame 21, the nut 24, which is pinned to bolt 22 by pin 26, is engaged by a deep hex socket 70 that is welded at 72 between two parallel retangular clamp plates 74. The plates 74 straddle the frame member 21 through which bolt 22 extends and corner bolts 76 extending through corner apertures 78 rigidly clamp the plates 74 to the frame member 21. As illustrated in FIGS. 2 and 3, the socket 70 is positioned at the edge portions of the plates 74 remote from the frame member 21 to enable the socket 70 to telescope over the nut 24 thereby preventing rotation of the nut 24 and bolt 22 in relation to the frame member 21.

With this construction, the incline climbing brake can be easily attached to existing or newly constructed wheelchairs and provides an effective and positive incline brake to prevent a wheelchair from rolling down an incline and will enable the occupant of the wheelchair to move or roll up an incline by rotating the wheelchair wheels in a conventional manner with the ratchet mechanism preventing reverse rotation of the wheels when the occupant of the wheelchair releases the annular ring 80 rigid with the wheelchair wheel in order to move the hands back to another starting point for rotating the wheels incrementally to roll the wheelchair up an incline in a step-by-step manner. The ratchet assembly on each wheel enables the wheelchair to be steered in a desired manner and the reversability of the ratchet assembly enables the incline climbing brake to be utilized when the wheelchair is climbing an incline in a forward direction or in a rearward direction.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. An incline climbing brake for a large supporting wheel on a wheelchair, said brake comprising a ratchet assembly including a ratchet gear, means supporting the ratchet gear from the wheelchair and preventing rotational movement of the ratchet gear, a pair of pawls engageable with the ratchet gear, means supporting the pawls from the wheel for rotational movement with the wheel and pivotal selective engagement with the ratchet gear to permit rotational movement of the wheel in one selected rotational direction in relation to the ratchet gear thereby locking the wheelchair wheel against rotational movement in an opposite rotational direction, said means supporting the pawls including a housing enclosing the ratchet gear and pawls with the pawls being pivotally mounted in the housing and including external handle means to selectively engage the pawls with the ratchet gear and radially extending means rigid with the housing for mounting the housing rigidly with respect to the wheelchair wheel.

2. The structure as defined in claim 1 wherein said means mounting the housing from the wheel includes a pair of diametrically extending rigid members extending from the housing to a terminal end spaced from a rim on a wheelchair wheel, adjustable clamp means mounted on the outer end of each member for radial clamping engagement with the wheel rim thereby mounting the housing and pawls for rotational movement with the wheel with selective engagement of the pawls with the ratchet gear enabling selection of one-way rotation of the wheel thereby enabling a wheelchair occupant to maneuver the wheelchair up an incline and preventing the wheelchair from rolling freely down the incline due to gravity.

3. The structure as defined in claim 2 wherein said ratchet gear includes a square shaft extending outwardly of the housing, said means supporting the ratchet rear from the wheelchair including a socket telescopically receiving the square shaft and means securing the socket to the wheelchair in axial alignment with a rotational axis of the wheelchair wheel.

4. The structure as defined in claim 3 wherein said means securing the socket includes a stationary axle bolt which rotatably supports the wheelchair wheel on the wheelchair.

5. The structure as defined in claim 4 wherein said axle bolt extends through a frame member of the wheelchair and is provided with a polygonal head on the axle bolt outer end retaining a hub of the wheelchair wheel rotatably mounted on the wheelchair and a polygonal nut on the axle bolt inner end engaged with the frame member, said socket telescopically receiving said square shaft being engaged with the axle bolt polygonal head to lock the ratchet gear to the axle bolt, means locking the nut and axle bolt in non-rotatable relation, a socket engaged with said nut and a pair of clamp plates rigid with the socket engaging the nut, said clamp plates straddling the frame member and being clamped thereto by clamp bolts extending through the clamp plates.

6. In combination, a wheelchair having a frame, a wheelchair wheel having a center hub, a rim and tire supported from the hub, stationary axle means rotatably supporting the hub from the wheelchair frame to engage rotation of the wheel in either direction when propelling the wheelchair, and an incline brake for selectively locking the wheelchair wheel against rotation in a forward or rearward direction, said incline brake comprising a ratchet assembly including a housing, a ratchet gear mounted in said housing to enable rotation between the ratchet gear and housing, means non-rotatably connecting the ratchet gear to the wheelchair, means non-rotatably connecting the housing to the wheel, and ratchet pawl means interconnecting the housing and ratchet gear to enable selective relative rotation between the housing and ratchet gear in only one direction, handle means oriented externally of said housing and connected to said pawl means to enable selection of a forward or rearward rotational direction of the housing and wheel while locking the housing and wheel in a rotational direction opposite to the selected direction.

7. The combination as defined in claim 6 wherein said means connecting the ratchet gear to the wheelchair includes a square shaft rigid with the ratchet gear and extending outwardly from the housing, a socket rigidly affixed to the wheelchair axle means and telescopically receiving the shaft in non-rotatable, releaseable relation to prevent rotation of the ratchet gear and enable separation of the ratchet assembly from the wheelchair.

8. The combination as defined in claim 6 wherein said means connecting the housing to the wheel includes a pair of diametrically opposed arms rigid with the housing, means on the outer end of each arm detachably engaged with the rim of the wheel, each of said arms being longitudinally adjustable to move the means on the outer ends of the arms into secure engagement with the rim.

9. The combination as defined in claim 7 wherein said means connecting the housing to the wheel includes a pair of diametrically opposed arms rigid with the housing, means on the outer end of each arm detachably engaged with the rim of the wheel, each of said arms being longitudinally adjustable to move the means on the outer ends of the arms into secure engagement with the rim.

10. The combination as defined in claim 9 wherein said means on the outer end of each arm is an adjustable split clamp to clamplingly engage the wheel rim, each of said arms including telescopically arranged members with screw threaded means interconnecting said members to adjust the length of said arms.

11. The combination as defined in claim 7 wherein said axle means includes a bolt which extends through a frame member of the wheelchair and is provided with a polygonal head on the axle bolt outer end retaining a hub of the wheelchair wheel rotatably mounted on the wheelchair and a polygonal nut on the axle bolt inner end engaged with the frame member, said socket telescopically receiving said square shaft being engaged with the axle bolt polygonal head to lock the ratchet gear to the axle bolt, a pin extending through the nut and axle bolt for locking the nut and axle bolt in non-rotatable relation, a socket engaged with said nut and a pair of clamp plates rigid with the nut engaging socket, said clamp plates straddling the frame member and being clamped thereto by clamp bolts extending through the clamp plates.

12. The combination as defined in claim 6 wherein said pawl means includes a pair of pawls independently pivotally mounted in said housing, said handle means including a separate handle for each pawl.

* * * * *